(12) United States Patent
Russbueldt et al.

(10) Patent No.: US 9,847,615 B2
(45) Date of Patent: Dec. 19, 2017

(54) METHOD AND ARRANGEMENT FOR SPECTRAL BROADENING OF LASER PULSES FOR NON-LINEAR PULSE COMPRESSION

(71) Applicants: FRAUNHOFER-GESELLSCHAFT ZUR FOERDERUNG DER ANGEWANDTEN FORSCHUNG E.V., Munich (DE); MAX-PLANCK-GESELLSCHAFT ZUR FOERDERUNG DER WISSENSCHAFTEN E.V., Munich (DE)

(72) Inventors: Peter Russbueldt, Herzogenrath (DE); Johannes Weitenberg, Aachen (DE); Andreas Vernaleken, Munich (DE); Thomas Sartorius, Aachen (DE); Jan Schulte, Hamburg (DE)

(73) Assignees: FAUNHOFER-GESELLSCHAFT ZUR FOERDERUNG DER ANGEWANDTEN FORSCHUNG E.V., Munich (DE); MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 15/310,506

(22) PCT Filed: May 12, 2015

(86) PCT No.: PCT/EP2015/060484
§ 371 (c)(1),
(2) Date: Dec. 5, 2016

(87) PCT Pub. No.: WO2015/173245
PCT Pub. Date: Nov. 19, 2015

(65) Prior Publication Data
US 2017/0125964 A1 May 4, 2017

(30) Foreign Application Priority Data
May 15, 2014 (DE) .................. 10 2014 007 159

(51) Int. Cl.
*G02F 1/35* (2006.01)
*H01S 3/00* (2006.01)
*G02F 2/02* (2006.01)

(52) U.S. Cl.
CPC .......... *H01S 3/0092* (2013.01); *G02F 1/3511* (2013.01); *H01S 3/0057* (2013.01); *G02F 2001/3503* (2013.01); *G02F 2201/17* (2013.01)

(58) Field of Classification Search
CPC .... H01S 3/0092; H01S 3/0057; G02F 1/3511; G02F 2001/3503; G02F 2201/17
See application file for complete search history.

(56) References Cited

U.S. PATENT DOCUMENTS 9,219,344 B2 * 12/2015 Zhang .................. H01S 3/10
9,678,405 B2 * 6/2017 Mironov ............... G02F 1/3501
(Continued)

OTHER PUBLICATIONS

International Search Report dated Oct. 19, 2015 in related application No. PCT/EP2015/060484.
(Continued)

*Primary Examiner* — Rhonda Peace
(74) *Attorney, Agent, or Firm* — Renner Kenner Greive Bobak Taylor & Weber (57) ABSTRACT

A method and an arrangement of spectrally broadening laser pulses for non-linear pulse compression is disclosed which is based on the transition from the spectral broadening in a waveguide to the spectral broadening in a suitably shaped lens conductor. The arrangement is non-sensitive with
(Continued)

respect to the variations of the pulse power, the position and parameters of the laser beam. The spectrally broadened pulses can be compressed in a satisfactory manner and the quality of the laser beam maintained by dividing the nonlinear phase required for spectral broadening into sufficiently smaller steps which can be separated without nonlinearity by suitable prorogation. The limitation of the pulse powers to less than the critical power of dielectrics is thus overcome and a pulse energy range for which the spectral broadening in the glass fibers cannot be used, is developed. The arrangement can compress pulses having a large average power.

18 Claims, 4 Drawing Sheets

(56) References Cited

U.S. PATENT DOCUMENTS

| | | | |
|---|---|---|---|
| 2013/0250982 A1 | 9/2013 | Zhang et al. | 372/21 |
| 2014/0002892 A1 | 1/2014 | Russbuldt et al. | 359/328 |
| 2017/0125964 A1* | 5/2017 | Russbueldt | H01S 3/0092 |

OTHER PUBLICATIONS

German Search Report dated Oct. 29, 2014 in related application No. DE 10 2014 007 159.6.
Written Opinion dated Oct. 19, 2015 in related application No. PCT/EP2015/060484.
Jocher et al; *Sub 25 fs pulses from solid-core nonlinear compression stage at 250 W of average power*; Optics Letters; Nov. 1, 2012; vol. 37, No. 21; pp. 4407-4409.
Klenke et al.; *Divided-pulse nonlinear compression*; Optics Letters; Nov. 15, 2013; vol. 38, No. 22; pp. 4593-4596.
Rothhardt et al.; *1 MHz repetition rate hollow fiber pulse compression to sub-100-fs duration at 100 W average power*; Optics Letters; Dec. 1, 2011; vol. 36, No. 23; pp. 4605-4607.
Emaury et al.; *Beam delivery and pulse compression to sub-50 fs of a modelocked thin-disk laser in a gasfilled Kagome-type HC-PCF fiber*; Optics Express; Feb. 25, 2013; vol. 21, No. 4; pp. 4986-4994.
Fourcade-Dutin et al.; *Milli-Joule femtosecond laser-pulse delivery and compression in hypocycloid core Kagome HC-PCF*; CLEO 2013, CTh5C.7 (2013).
Schulz et al; *Yb: YAG Innoslab amplifier: efficient high repetition rate subpicosecond pumping system for optical parametric chirped pulse amplification*; Optics Letters; Jul. 1, 2011; vol. 36, No. 13; pp. 2456-2458.
Mevel et al.; *Extravacity compression technique for high-energy femtosecond pulses*; J. Opt. Soc. am. B.; Jan. 2003; Vo. 20, No. 1; pp. 105-108.
Durfee et al.; *Pulse compression in a self-filtering Nd: YAG regenerative amplifier*; Optics Letters; Jan. 1, 1992; No. 1; pp. 37-39.
Pupeza, Joachim; *Power Scaling of Enhancement Cavities for Nonlinear Optics*; Dissertation Max-Planck Institut Fur Quantenoptik; Oct. 2011; Garching, Germany; MPQ 339.
Yefet et al.; *A Review of Vacity Design for Kerr Lens Mode-Locked Solid-State Lasers*; Applied Sciences; Dec. 2013; vol. 3; pp. 694-724.
Carstens et al.; *Large-mode enhancement cavities*; Opt. Express; May 2013; vol. 21; pp. 11606-11617.
Hadrich et al.; *Nonlinear compression to sub-30-fs, 0.5mJ pulses at 135 W of average power*; Optics Letters; Oct. 1, 2013; vol. 38, No. 19; pp. 3866-3869.

* cited by examiner

METHOD AND ARRANGEMENT FOR SPECTRAL BROADENING OF LASER PULSES FOR NON-LINEAR PULSE COMPRESSION

CROSS-REFERENCE TO RELATED APPLICATION

This is a §371 application of International patent application number PCT/EP2015/060484 filed May 12, 2015, which claims the benefit of German patent application number 10 2014 007 159.6 filed on May 15, 2014, and which is incorporated herein by reference.

TECHNICAL FIELD

The present invention relates to a method for spectral broadening of laser pulses for non-linear pulse compression, in which the laser pulses are input into an optical arrangement in which they propagate through at least one medium with non-linear optical properties, in which the laser pulses are endowed with a non-linear phase through self-phase modulation. The invention also relates to an optical arrangement designed to perform the method.

Pulsed laser radiation has many applications in science and industry. The duration of the pulse, the energy of the pulse and the average power of the pulse all represent important factors. As a general rule, a short pulse duration is advantageous for many applications. In order to observe physical processes on short timescales, pulses with a corresponding pulse duration are needed. Short pulses allow high intensities, which in turn enable efficient non-linear/parametric processes such as frequency multiplication. High intensities can also cause non-linear absorption, which is exploited for example in 3D crystal engraving, ISLE (in-volume selective laser etching), eye surgery, or two-photon microscopy. With regard to material processing, it is particularly significant that material can be removed more precisely with short pulse duration because the heat-affected zone and the thickness of the melt film are small and interaction with the material vapour plasma is avoided.

The pulse duration of a laser beam source is limited by the amplification bandwidth of the laser medium or the amplification medium. However, the material properties associated with the chosen medium also limit other parameters of the laser beam, particularly the average power that can be reached by thermal management (degree of heating power, thermal conductivity, coefficient of thermal expansion, temperature dependency of the refractive index, ultimate stress, thermal quenching etc.). In order to reach certain parameters of the laser beam, it may be helpful to compress the pulses subsequently. This applies for example for ultrashort pulses from Yb-based laser beam sources, which enable a high average power. Depending on the host medium and laser architecture (oscillator or MOPA), Yb-doped media enable pulse durations of about 800 fs (Yb:YAG) or about 200 fs (Yb:glass) for example. This pulse duration may be compressed to about 25 fs, for example (Ch. Jocher et al., "Sub 25 fs pulses from solid-core nonlinear compression stage at 250 W of average power," Opt. Lett. 37, 4407-4409 (2012); S. Hädrich et al., "Nonlinear compression to sub-30-fs, 0.5 mJ pulses at 135 W of average power," Opt. Lett. 38, 3866-3869 (2013)). Smaller compression factors are interesting for many applications, from about 800 fs to 200 fs for example, because the quality of material removal is improved significantly even with these values. For this, pulse energies in the range of a few tens of µJ are needed, for which compression in glass fibres is not usable.

PRIOR ART

Non-linear pulse compression by means of spectral broadening through self-phase modulation (SPM) and subsequent removal of chirp is a widely used method. In this context, spectral broadening is achieved through Kerr non-linearity (variation in refractive index $\Delta n = n_2 I$ with intensity I, non-linear refractive index $n_2$) in a non-linear medium. The phase of the pulse is rapidly temporally modulated according to $\Phi(t) = k_n \Delta n L = k_n n_2 I(t) L$ through the temporal envelope of pulse intensity I(t), with wave number $k_n$ and propagation length L in the medium. In this way, new frequencies are generated according to $\omega = -\delta/\delta t \Phi(t)$. Accordingly, the spectrum of the laser pulse is broadened continuously during propagation in the non-linear medium. With negligible dispersion, the pulse shape remains constant, so the pulse is chirped. Then the pulse can be compressed by removing the chirp.

However, the intensity varies not only temporally but also spatially according to the beam profile I(x, y), which is assumed to be Gaussian here. The consequences of this are two-fold. Firstly, the spectral broadening is not uniform over the beam profile, but more pronounced along the beam axis, and secondly it results in a pulse-induced (for $n_2 > 0$) focusing lens (Kerr lens) whose refractive power in turn changes according to the temporal envelope of the pulse. As a result, the pulse may not be fully compressible after spectral broadening, and the quality of the beam is impaired.

Both of these problems may be solved if the radiation is guided in a waveguide. The magnitude of the intensity is then preserved over a long propagation in the non-linear medium, and a large non-linear phase $\Phi_{NL} = k_n n_2 I_m L$ may be acquired, wherein the Kerr lens is of little effect compared with the focusing by the guide in the waveguide. The influence of the (time-dependent) Kerr lens is therefore small. Aberrations of the Kerr lens are diffracted out in a fundamental mode waveguide. The size of the non-linear phase is freely selectable over the length of the waveguide and is only limited by losses and dispersion in the waveguide. The beam profile is mixed during propagation in the waveguide such that a spectral broadening is realised that is uniform over the entire profile. Consequently, the pulses lend themselves well to compression and the beam quality is preserved.

When the beam is guided in a waveguide, the non-linear phase can become very large, but the pulse power is limited. For pulse powers greater than the critical power for self-focusing $P_{crit} = \lambda_0^2/(2\pi n n_2)$, the focusing effect of the Kerr lens is stronger than the natural divergence of the beam, so the beam is focused increasingly as the propagation progresses, and finally the medium is destroyed (catastrophic self-focusing). This limitation cannot be avoided with a temporal extension of the pulses to lower the pulse power, as is used in amplifiers (chirped pulse amplification, CPA), because spectral broadening depends on the chirp of the pulse.

Quartz glass fibres or gas-filled capillaries are used as the waveguide. For quartz glass and a 1 µm wavelength, critical power is $P_{crit} = 4$ MW with $n_2 = 2.7 \cdot 10^{-16}$ cm$^2$/W, which corresponds to a pulse energy of $E_{crit} = 3$ µJ with a pulse duration $\tau = 800$ fs. Slightly higher pulse energies can be obtained by setting circular polarisation of the beam in the fibre ($P_{crit} = 6$ MW) and with DPC (divided pulse compression), that is to say by temporally dividing the pulses and superimposing after broadening (A. Klenke et al., "Divided-pulse nonlinear compression," Opt. Lett. 38, 459304596 (2013)). According to the prior art, however, non-linear compression in glass fibres is limited by catastrophic self-focusing to pulse energies E<5 μJ.

In order to compress greater pulse energies, the critical power may be increased, i.e. a non-linear medium with smaller non-linear refractive index $n_2$ may be selected. Noble gases whose non-linearity can also be set via gas pressure p are used for this. Possible values are for example $\eta_2=n_2/p=0.29 \cdot 10^{-20}$ cm$^2$/W/bar (helium), $9.8 \cdot 10^{-20}$ cm$^2$/W/bar (argon) or $45.2 \cdot 10^{-20}$ cm$^2$/W/bar (xenon). The beam is guided in a glass capillary. The result of this is that besides an upper limit on the pulse energy due to self-focusing, a lower limit is also set. In order to acquire a sufficient non-linear phase the pulse energy must not be too small, since the product of the capillary length and intensity (given by the capillary cross section) cannot be of any size. The guidance of the radiation is not based on total reflection as it is in a quartz glass fibre, which allows practically lossless guidance, but on reflection by grazing incidence on the wall of the capillary. Since the degree of reflection for finite angles of incidence with the surface is less than one, the guide is lossy. At the same time, a smaller capillary cross section yields a larger angle of divergence, and therewith greater losses from reflection, with the result that the length of the capillary is limited. A further limitation is the generation of a plasma and absorption therein. Since the non-linear refractive index at atmospheric pressure is about four orders of magnitude smaller than in dielectrics and the gas pressure cannot be selected with any size, this method is only suitable for considerably larger pulse energies of about E>200 μJ (J. Rothhardt et al., "1 MHz repetition rate hollow fiber pulse compression to sub-100-fs duration at 100 W average power," Opt. Lett. 36, 4605-4607 (2011)).

One alternative to the gas capillary is to guide the beam in hollow core fibres, e.g. of the Kagome type, which can be filled with a gas. Since the losses during guidance are significantly lower than in a capillary (a few hundred dB/km), the fibre can be long (several meters) and a large non-linear phase can be acquired even with relatively small pulse energies. Pulses with energies in the range from 1-1000 μJ were compressed by spectral broadening in Kagome fibres (F. Emaury et al., "Beam delivery and pulse compression to sub-50 fs of a modelocked thin-disk laser in a gas-filled Kagome-type HC-PCF fiber," Opt. Express 21, 4986-4994 (2013); C. Fourcade-Dutin et al., "Milli-Joule femtosecond laser-pulse delivery and compression in hypocycloid core Kagome HC-PCF," CLEO 2013, CTh5C.7 (2013)). The losses in the fibre and the incomplete coupling efficiency may represent a limitation of average power.

It is also possible to guide pulse powers greater than the critical power in a non-linear medium if there is a mechanism that counteracts the self-focusing. Such a mechanism is defocusing by a plasma which is created by ionisation due to the great intensity of the pulse. A density profile of free electrons that follows the intensity profile of the pulse causes defocusing, because the refractive index is reduced by the free electrons. This mechanism can be used both in gases and solids (M. Schulz et al., "Yb:YAG Innoslab amplifier: efficient high repetition rate subpicosecond pumping system for optical parametric chirped pulse amplification," Opt. Lett. 36, 2456-2458 (2011)), but a prerequisite therefor is that sufficient electron density can be generated without destroying the medium. The self-focusing and plasma-defocusing either cancel each other out or alternate with each other along the propagation. In such a filament it is possible to achieve significant spectral broadening. In gases, self-compression is also observed. The method is associated with substantial losses due to ionisation, and is thus limited in average power as well.

In theory, it is also possible to achieve spectral broadening during transit through a non-linear medium in free propagation and without ionisation. For sufficiently short propagation distances in the non-linear medium, catastrophic self-focusing in the medium can be avoided and a non-linear phase of about $\Phi_{NL}=2\pi$ can be acquired. However, the Kerr lens exerts significant influence in such an arrangement, causing a substantial temporal change in the beam parameters and an inhomogenous broadening over the beam profile, resulting in poor compressibility. This drawback can be recovered in part by the subsequent spatial filtering of a section of the beam profile, although this involves considerable losses (E. Mével et al., "Extracavity compression technique for high-energy femtosecond pulses," J. Op. Soc. Am. B20, 105-108 (2003)).

The existing methods for non-linear pulse compression are all associated with various limitations. The average power is limited as well as the pulse energy. In the case of lossy methods, high power causes destruction of components. This also applies for incomplete coupling in a waveguide, which is unavoidable in the case of beam quality that is not diffraction-limited and due to fluctuations in the beam axis (pointing stability) and beam parameters. To date, no method exists that enables the non-linear compression of pulses with a few tens of μJ pulse energy at 1 μm wavelength and a pulse duration of a few hundred fs and large average powers of several hundred Watt.

The object of the present invention consists in providing a method and an arrangement for spectral broadening of laser pulses for non-linear pulse compression, which are usable for pulse powers greater than the critical power of the non-linear medium used for the spectral broadening and are unaffected by a variation of the beam position, the beam parameters (q-parameters) or the beam profile of the laser beam.

SUMMARY OF THE INVENTION

The object is achieved with the method and arrangement according to patent claims 1 and 11. Advantageous embodiments of the method and of the arrangement are subject matter of the dependent claims or will be evident from the following description and the exemplary embodiments.

In the proposed method, the laser pulses are input into an optical arrangement in which they propagate alternately through at least one section that contains at least one medium with non-linear optical properties and in which the laser pulses are given a non-linear phase through self-phase modulation, and at least one section in which essentially no non-linear phases are generated by self-phase modulation. In these intermediate sections, therefore, self-phase modulation is negligible, that is to say a non-linear phase generated by self-phase modulation is at least ten times smaller than in the medium with the non-linear optical properties. The arrangement has eigenmodes with a Gaussian beam as the fundamental mode. In this context, the laser pulses are input into the arrangement with beam parameters that substantially correspond to the beam parameters of the arrangement (eigen-q-parameters). The pulse power of the laser pulses is selected to be greater than the critical power of the medium with non-linear optical properties. The non-linear phase of the laser pulses that is generated with each pass through the medium with non-linear optical properties or through the respective section is set by selection of the medium length and the intensity of the laser pulses to be so small that catastrophic self-focusing does not occur within the medium. The number of passes required to generate non-linear phase is at least 10 in the suggested method, and is selected such that upon exiting the arrangement the laser pulses have a desired non-linear phase for pulse compression. In the suggested method, the optical arrangement is dimensioned such that the Gouy parameter $\psi$ of the arrangement, which represents the Gouy phase that is acquired by the eigenmode during a (single) propagation through the medium with non-linear optical properties and the section without self-phase modulation, does not lie in the middle or directly on the edge of the stability range $0 \leq \psi \leq \pi$ of the arrangement.

Alternating propagation through a section or a medium with non-linear optical properties, hereafter also referred to as a non-linear medium, and a following section with negligible self-phase modulation may be achieved by providing a single element with non-linear optical properties, through which the laser pulses propagate multiple times via a mirror arrangement, or also by providing multiple elements with non-linear optical properties which are arranged one behind the other and at a distance from one another in the direction of propagation of the laser pulses. It is advantageous for the beam to pass through this arrangement multiple times even when the arrangement consists of multiple elements with non-linear optical properties, in order to enable a compact construction.

By separating the generation of the non-linear phase which is needed for the spectral broadening into at least 10 passes through a non-linear medium, each of which having interposed sections with negligible self-phase modulation, the pulse power of the laser pulses can be selected to be larger than the critical power of the non-linear medium with regard to self-focusing. Even so, the desired size of the non-linear phase is obtained by repeated passes through a non-linear medium, that is to say repeated passes through a single non-linear element of such kind or the single or repeated pass through a plurality of non-linear elements of such kind arranged at a distance from each other. The method and the arrangement are therefore suitable for pulse energies of laser pulses that cannot be reached with quartz glass fibres, and at the same time for large average powers. Due to the special dimensioning of the arrangement, the output q-parameter of the laser radiation emerging from the arrangement is rendered independent of the current power, i.e. it does not vary temporally over the pulse, and the pulse is readily compressible. The selected arrangement is not sensitive to interferences in the beam profile. The method and arrangement functions without limiting apertures or filters, so the total transmission of the arrangement can be very high. At the same time, this is a completely passive arrangement with no amplification.

The arrangement is preferably dimensioned such that resonances of higher transverse modes in the arrangement are avoided, and the Gouy parameter $\psi$ lies closer to the edge than the middle of the stability range.

The dimensioning of the arrangement depends on the desired size of the non-linear phase. For a larger non-linear phase, more passes through a medium with non-linear optical properties must be made, wherein a particular Gouy parameter range is again advantageous for each non-linear phase size. If a solid medium is used to produce the non-linear phase of the laser pulses, the material, that is to say the non-linear refractive index, and thickness of the medium are preferably selected dependent on the intensity of the laser pulses in the medium such that the non-linear phase produced during each pass through the medium has a value of $\leq \pi/10$.

The dimensioning of the arrangement that is necessary for the desired non-linear phase may be calculated in a simulation, as was carried out to produce the diagrams shown in the figures of the following more detailed description of the method.

In one variation of the suggested method and the associated arrangement, a gas-phase medium is used as the medium with non-linear optical properties. The non-linear optical properties of the gas-phase medium, which may be located in a gas cell for example, may then be adjusted via the gas pressure. In a further variation, it is also possible to use a gas mixture at atmospheric pressure and set the non-linear optical properties using the partial pressure of the two different gases.

In a preferred variant, the arrangement that is designed to perform the method includes at least two mirror elements, on which the laser pulses are reflected multiple times. The arrangement is preferably constructed as a multipass cell, in the form of a "Herriott cell" for example. In an arrangement with the mirror elements, the medium may be arranged as a non-linear element between the mirror elements. However, it may also be formed by at least one mirror substrate of one of the mirror elements or by the mirror substrates of both mirror elements. In this case, the rear of each substrate is provided with the highly reflective coating. Of course, multiple non-linear elements may also be arranged between the mirrors as a non-linear medium, in which case they too must be located at a distance from each other to ensure that a section with negligible self-phase modulation exists between them. The dispersion that takes place during transit through the arrangement may be at least partly compensated for with the aid of suitable mirror coatings (chirped mirrors). The present arrangement may be described as a lens conductor, which may be of periodic or also non-periodic design.

In the suggested method and the associated arrangement, the non-linear phase that is necessary for spectral broadening is divided into sufficiently small steps that are separated by suitable propagation without non-linearity. In this way, the limitation to pulse powers smaller than the critical power of dielectrics may be overcome and a pulse energy range may be accessed which is not reachable by spectral broadening in glass fibres. Since the arrangement has no limiting aperture and consequently does not absorb or truncate any power, it is particularly suitable for compressing pulses with high average power.

BRIEF DESCRIPTION OF THE DRAWING

In the following, the suggested method and associated arrangement will be explained again, in greater detail, with reference to exemplary embodiments thereof and in conjunction with the drawings. In the drawings.

WAYS TO IMPLEMENT THE INVENTION

The suggested method and the advantages that become accessible therewith will be explained again in greater detail in the following. First, the influence of the Kerr lens under various conditions of propagation in non-linear media will be discussed. This will be followed by an explanation of how the limitation of the Kerr lens is overcome by the suggested method.

When a pulse is propagated with great pulse power in a medium with Kerr non-linearity, two effects occur: the temporal change in momentary intensity I(t) gives rise to new frequencies (self-phase modulation), and the transverse intensity profile I(x, y) induces a lens effect (self-focusing). Since the momentary intensity depends on its location in the beam profile and the beam profile depends on the time, these two effects are linked to each other and (generally) require (numeric) solution of the non-linear Schrödinger equation to describe the propagation. However, understanding of the situation may also be helped if the two effects are considered separately.

The temporal effect is quantified using the non-linear phase $\phi_{NL} = k_0 \int \Delta n \cdot dz = k_0 \int n_2 I_m \cdot dz$, which is acquired during propagation in a medium with non-linear refractive index $n_2$. This refers to the maximum value of the temporally varying non-linear phase, that is to say for $P(t)=P_p$. If the pulse shape is known, the maximum temporal change of phase $\partial/\partial t \phi(t)$ and therewith also the spectral broadening may be calculated therefrom. For the intensity in this case (as usual), the value $I_m = P_p/(\pi w^2)$ averaged over the beam profile with beam radius w is used, with $P_p$ being the pulse power. In a waveguide, the effective beam cross section $A=\pi w^2$ is constant, so the non-linear phase may be written as $\phi_{NL}=k_0 n_2 L P_p/A$ (assuming the pulse power is also constant). In free propagation, the non-linear phase is described with:

$$\phi_{NL} = k_0 \int n_2 \frac{P_p}{\pi w^2} dz =$$

$$\frac{k_0 n_2}{\pi} P_p \int \frac{1}{w^2} dz = \frac{k_0 n_2}{\pi} P_p \frac{k_n}{2} \int d\psi = \frac{k_0^2 n_2 n}{2\pi} P_p \cdot \psi = \frac{P_p}{P_{crit}} \cdot \psi$$

with Gouy phase $\psi$ and $\partial\psi/\partial z = \partial/\partial z \arctan((z-z_0)/z_R) = 2/k_n \cdot 1/w^2$, and $P_{crit} \propto \lambda_0^2/(2\pi n n_2)$.

The non-linear phase is a measure of the spectral broadening. A phase of $\phi_{NL} < \pi/2$ does not yet bring about any appreciable broadening, whereas a non-linear phase of $\phi_{NL} = 2\pi$ is necessary to achieve a pulse shortening of a $\text{sech}^2$-shaped pulse by a factor of 3, for example.

In order to quantify the spatial influence of the Kerr effect, the B integral is used as a measure of the non-linear phase acquired during propagation along the beam axis through the non-linear medium: $B=k_0 \int n_2 I_0 \cdot dz$. Given the definition over intensity $I_0$ on the beam axis, for a Gaussian beam $B=2\phi_{NL}$. For non-critical influence of the beam, a limit value of $B<\pi$ is often specified, wherein other criteria must also be taken into account depending on the situation.

The self-focusing due to the Kerr lens causes the beam caustic to change compared with free propagation. In the following, however, it will be assumed that the shape of the beam profile, which is assumed to be Gaussian, is not changed by the aberration of the Kerr lens (in fact, aberration is inherent in the Kerr lens because it follows the Gaussian intensity profile instead of a parabola). The refractive power of the Kerr lens is $1/f_{Kerr}=2n_2 P_p/(\pi w^4)d$, where d is the propagation length in the medium. The value used here for $f_{Kerr}$ minimises the quadratic phase deviation from a lens without aberration, weighted with the intensity of the Gauss profile.

Propagation by an infinitesimal distance dz in the non-linear medium is thus described by the beam transfer matrix $M(z)=[[1,ndz],[-2n_2 P/(\pi w^4)dz,1]]$, which is dependent on the beam radius w(z). If follows that for a Gaussian beam, of which the waist has a radius $w_0$ at the start of the non-linear medium: $w^2(z)=w_0^2(1+(1-P/P_{crit})z^2/z_R^2)$, $z>0$, wherein the critical power for self-focusing $P_{crit} \propto \lambda_0^2/(2\pi n n_2)$ was introduced.

For this value of the pulse power, the natural divergence is compensated by the self-focusing itself. For greater values, $P>P_{crit}$ catastrophic self-focusing occurs, i.e., the beam radius becomes smaller and smaller as it propagates farther in the non-linear medium until it finally reaches zero. This self-focus is at a distance $z_f = z_R/(P/P_{crit}-1)^{1/2}$. However, self-focus is only reached and the medium destroyed thereby when the focus is located within the non-linear medium. For a length of the non-linear mediums $d<z_f$, it may be possible to avoid destroying the medium. In this case, the B integral which is acquired in the non-linear medium with thickness d is expressed as follows: $B=P/P_{crit}^{1/2} \cdot \arctan(d/z_R(1-P/P_{crit})^{1/2})/(1-P/P_{crit})^{1/2}$.

When the waist is not positioned at the beginning of the non-linear medium, the beam radius in the non-linear medium is expressed as follows: $w^2(z)=w_0^2(1+(z+z_0)^2/z_R^2 - (P/P_{crit})z^2/z_R^2)$, $z>0$, wherein z0 stands for the distance from the beginning of the non-linear medium to the beam waist. Consequently, the B integral may have values considerably larger than $\pi$ (with a corresponding spectral broadening) still without reaching self-focus, particularly if the pulse power is greater than the critical power. In such a case, however, the Kerr effect is very strong, and a consideration of the pulse peak power alone is impermissible, i.e. it is noticeable that the effect of the effect of the Kerr lens varies according to the temporal envelope of the pulse and the spectral broadening according to beam profile. For this reason, a pulse that has been broadened in this way is poorly compressible. Furthermore, a real beam profile always contains slight intensity modulations (or they can arise due to imperfections in the medium), which become more pronounced due to the Kerr effect and can also become catastrophically focused. This effect is also called filamentation. The self-focusing distance for such beam profile interferences is typically much smaller than for the entire beam profile, and it therefore determines the limitation of the B integral for propagation in a non-linear medium to values not much greater than $B=\pi$.

When pulses with a pulse power smaller than the critical power propagate in a waveguide, the B integral can assume large values without catastrophic self-focusing occurring, i.e., the criterion $B<\pi$ does not apply. Since the pulse power is less than the critical power, the natural divergence is stronger than the self-focusing. Accordingly, neither the beam profile as a whole nor interferences in the profile can be augmented by the Kerr effect. But a large B integral may be obtained by keeping the intensity high through guidance over a long propagation segment in the waveguide. Since the self-focusing is weak compared with the focusing of the waveguide, it is negligible, and the dependency of the beam parameter on the momentary power is therefore also negligible. At the same time, the beam profile is intermixed during propagation in the waveguide, so that a homogenous broadening takes place over the entire beam profile. The spectrally broadened pulses are therefore readily compressible.

For a pulse power that is less than the critical power of the non-linear medium, a large B integral (i.e. a large non-linear phase) may be obtained by guidance in a waveguide. On the other hand, with pulse powers greater than the critical power, a large B integral can only be reached if the focusing by the Kerr lens is counteracted by a defocusing mechanism (via a plasma). However, the creation of a plasma is associated with losses and is not suitable for use with large average powers. A B integral in order of magnitude of $2\pi$ is also achievable in free propagation with high pulse power, but does not yield an easily compressible pulse.

The present invention is based on the fact that with the transition from spectral broadening in a waveguide to spectral broadening in a lens conductor the limitation of the pulse power to values lower than the critical power of the linear medium is overcome. Consequently, pulses with greater pulse power can be compressed. By appropriate selection of the parameters of the lens conductor, it is possible to achieve good compressibility of the pulses together with resistance to variation in the beam position, the beam parameters (q-parameters) and the beam profile.

To ensure that a pulse which has been spectrally broadened by self-phase modulation can be compressed to a smaller pulse duration, the spectrum must be broadened homogenously over the entire beam profile. It is generally thought that this is only possible through spectral broadening in a waveguide (fibre or hollow waveguide), while spectral broadening in free propagation is necessarily weaker at the edge of the beam profile than on the beam axis. In the following text, we are going to explain that this is not necessarily the case.

Spectral broadening is produced by imposing a temporally varying phase on the pulse, which in this case is determined by the temporal gradient of the pulse itself (self-phase modulation). Initially, it is not obvious what non-linear phase shift is produced at a time point t with momentary power P(t), since the non-linear phase also varies spatially according to the intensity profile I(x, y). The effect of the resulting (and temporally variable) Kerr lens is that not only the phase varies temporally over the pulse, but also the beam parameters. If the beam parameters fluctuate significantly and the temporal components of the pulse do not completely overlap spatially, the pulse is not fully compressible. In a waveguide, however, the effect of the Kerr lens and thus also the variation of the beam parameters with moderate momentary power is weak, so the pulse is readily compressible. But now the same may also apply for an arrangement with free propagation: while the temporal variation of the beam parameters—i.e. the variation with momentary power—is small, the pulse can be compressed. And then the spectrum is also broadened homogenously over the profile. Otherwise, inhomogenous broadening would mean that beam parameters deviate for some spectral components. The weak variation of the beam parameters can be reached in free propagation for larger pulse powers as well by splitting the non-linear phase into a series of sufficiently small packages in the non-linear medium and combining this suitably with propagation without a non-linear medium.

For propagation in a non-linear medium it is generally true that the acquired non-linear phase is linked to the acquired Gouy phase according to $\phi_{NL}=(P/P_{crit})\cdot\psi$, since both are determined by the integral over the inverse beam cross section. This therefore applies regardless of whether the propagation is free or guided. In both cases, the beam radius is modified by the effect of the Kerr lens if $P \ll P_{crit}$ is not true. In a waveguide, the eigenmode of the waveguide—the mode that is preserved during propagation—is modified by the additional effect of Kerr lens. In this context, the ratio of focusing of the Kerr lens and focusing of the waveguide is determined by the ratio of the momentary power to the critical power $P/P_{crit}$. The beam diameter in the eigenmode is made smaller by the additional focusing of the Kerr lens. To ensure that the influence of the Kerr lens on the eigenmode is not too large, approximately $P<0.5 \cdot P_{crit}$ must apply. For powers for which $P>P_{crit}$, the refractive power of the Kerr lens is too strong and an eigenmode no longer exists.

Figure 1:
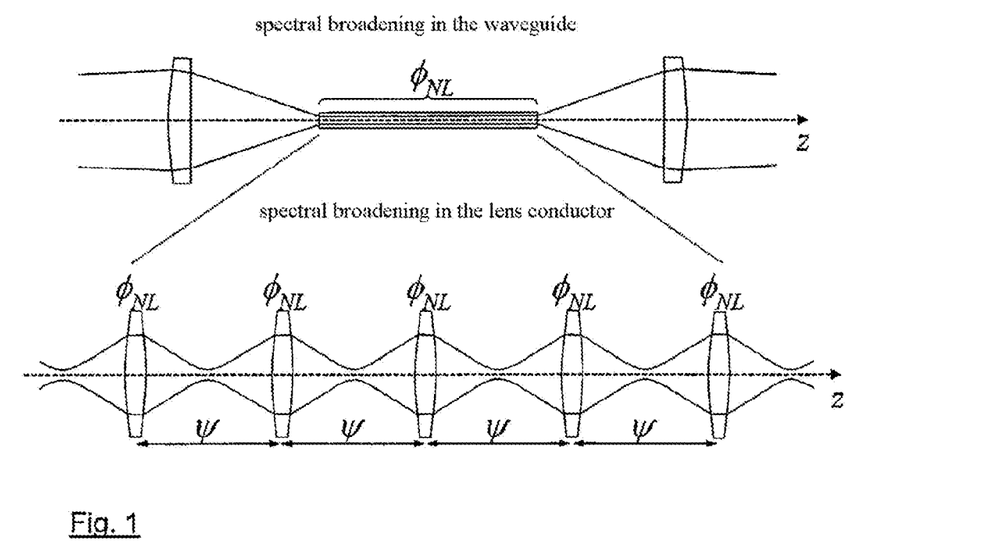
FIG. 1 is a schematic representation of the transition from a waveguide to a lens conductor for spectral broadening.

To overcome this limitation regarding pulse power, a transition may be made from a waveguide to a lens conductor, i.e. the focusing is no longer imposed continuously along the waveguide, but discretely in lenses. For this purpose, FIG. 1 is a schematic representation of the transition from the waveguide to the lens conductor for spectral broadening. The non-linear phase $\phi_{NL}$ is then acquired during the pass through the lenses, and the Gouy-Phase $\psi$ during propagation between the lenses. Accordingly, they are no longer acquired continuously as happens during propagation in the waveguide, but instead they represent discrete parameters. The Gouy phase, which characterises the lens conductor, is therefore referred to as the Gouy parameter in the present patent application. Unlike the waveguide, in the lens conductor the non-linear phase $\phi_{NL}$ and the Gouy parameter $\psi$ are decoupled, that is to say they are no longer connected in fixed manner to each other by $P/P_{crit}$. The non-linear phase can be selected using the thickness of the lens without consideration for the Gouy parameter, which is set by refractive power and the distance between the lenses. Accordingly, values $P>P_{crit}$ are possible. The situation may also be considered as one in which the lenses (the non-linear medium) are combined with air (having negligible non-linearity) to reduce the effective non-linear refractive index and thus increase critical power. In the following, we define $\phi_{NL}$ as the non-linear phase per pass through the non-linear medium. The cumulatively acquired non-linear phase is then $\Sigma\phi_{NL}=N\cdot\phi_{NL}$, in which N stands for the number of passes.

If the lens conductor consists of equivalent sections, it is characterised by the focal length f of the lenses and their distance L from each other. However, the beam radius w of the eigenmode at the site of the lens and the Gouy parameter $\psi$, that is to say the Gouy phase that the eigenmode (fundamental mode) acquires during propagation between the lenses, can also be used for the description, wherein the Gouy parameter may assume values $0 \leq \psi \leq \pi$. This is known as the stability range of the lens conductor.

Due to the effect of the Kerr lens, the eigenmode changes and thus becomes dependent on the momentary power of the pulse. The change of the eigenmode can also be described without reference to the specific arrangement (in terms of lenses, mirrors and distances), as a function of the phase $\phi_{NL}$ acquired in the non-linear element and the Gouy parameter $\psi$ for the propagation between the non-linear elements. Analysis has shown that the change of the eigenmode is particularly strong at the edges of the stability range. This change can be quantified by overlap U of the eigenmode with and without Kerr lens (see FIG. 2a). Due to the substantial change in the eigenmode brought about by the Kerr lens, an arrangement that is located very close to one of the stability edges is unsuitable. Firstly, a substantial variation of the eigenmode with power means that it is not possible to adapt the entire pulse with its temporal power gradient to the mode. Secondly, the change of ratios if the pulse power fluctuates is particularly large.

It is true that the eigenmode is hardly changed at all by the Kerr lens in the middle of the stability range, but a region occurs there which is unstable in the event of deviations from the eigenmode. Accordingly, if a beam with beam parameters that differ from the eigenmode passes through the arrangement, this deviation will become progressively larger. We call this region "Kerr-unstable". It is in the middle of the stability range (by $\psi=\pi/2$) and becomes broader with the non-linear phase (see FIG. 2b).

The Kerr lens also affects deviations from the eigenmode outside of this "Kerr-unstable" range. Such deviations "oscillate" when passing through the arrangement, that is to say the beam diameter fluctuates periodically as it passes through the arrangement, with the beam radius of the eigenmode as the centre value. Analysis shows that the frequency of this oscillation is altered by the Kerr lens. Consequently, deviations from the eigenmode (caused for example by imperfect mode adaption of the input beam) develop differently for different momentary powers as the beam passes through the arrangement, because the Kerr lens and thus also the oscillating frequency is dependent thereon. This results in a variation of the beam parameters over the temporal gradient of the pulse and consequently impaired compressibility. The change in oscillating frequency is smallest at the top edge of the stability range (see FIG. 2c).

The aberrations of the Kerr lens that result in resonant coupling into higher transverse modes for distinguished values of the Gouy parameter must also be borne in mind. Accordingly, Gouy parameters $\psi=n/p\cdot\pi$ with mode order p and n=1, . . . , p−1 should be avoided. Consequently, values are excluded in the stability range of the arrangement depending on the strength of the aberration and the number of passes, that is to say depending on the non-linear phase $\phi_{NL}$ and the total phase $\Sigma\phi_{NL}$.

Figure 2:
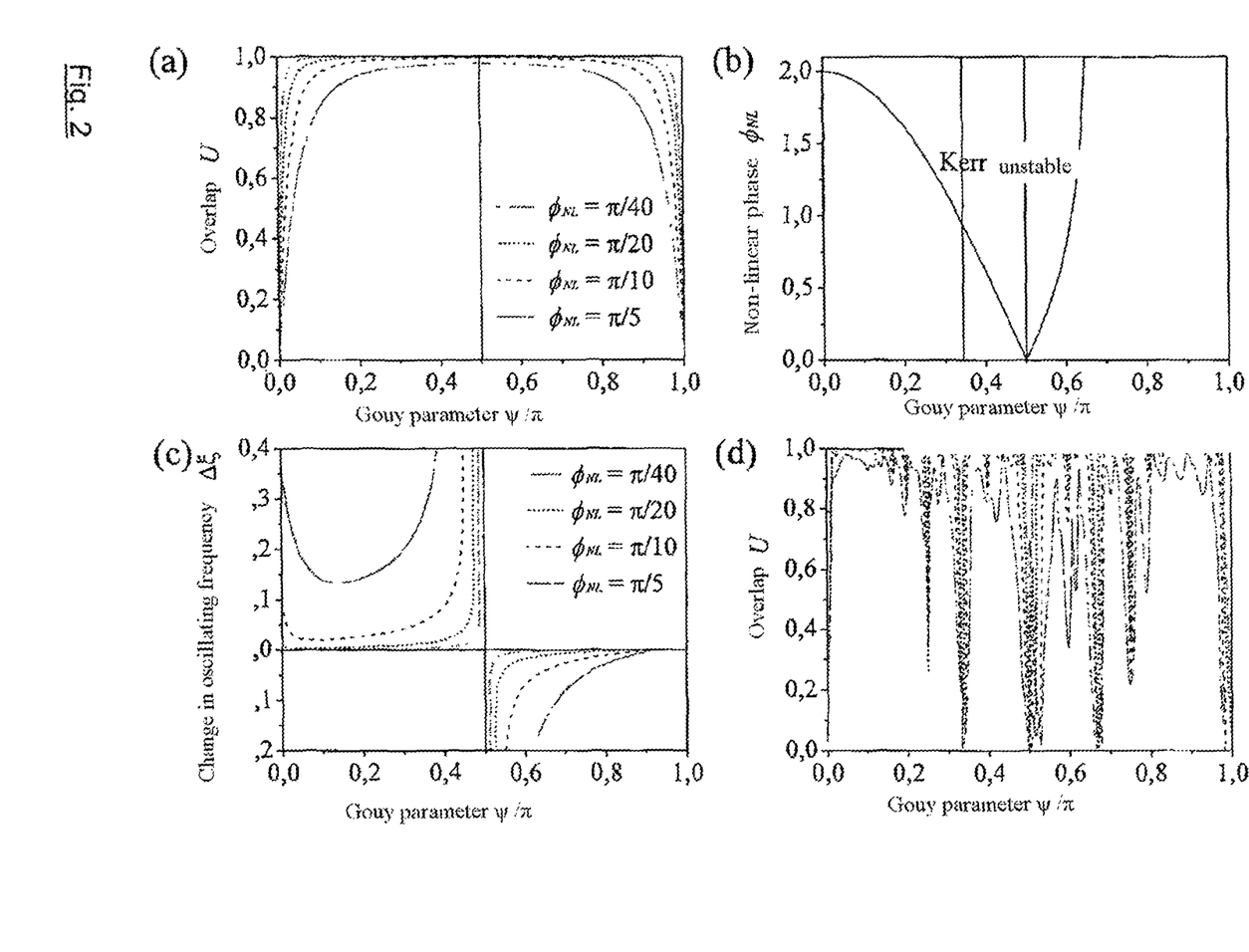
FIG. 2a is a diagram from a simulation showing the overlap between the eigenmode with and without Kerr lens as a function of the Gouy parameter of the arrangement for various non-linear phases.
FIG. 2b is a diagram from a simulation showing the Kerr stability range as a function of the Gouy parameter of the arrangement and the non-linear phase.
FIG. 2c is a diagram from a simulation showing the change in pump frequency through the Kerr lens as a function of the Gouy parameter of the arrangement for various non-linear phases.
FIG. 2d is a numerical simulation of a non-linear lens conductor for various phases per non-linear element.

Large power components in higher transverse modes also arise for a small non-linear phase $\phi_{NL}=\pi/40$ and a moderately sized total phase $\Sigma\phi_{NL}=2\pi$ for values $\psi=\pi/2$, $\psi=\pi/3$, $2\pi/3$, $\psi=\pi/4$, $3\pi/4$ and $\psi=\pi/5$, $2\pi/5$, $3\pi/5$, $4\pi/5$ (see FIG. 2d). For larger non-linear phases and larger total phases, these resonances become stronger and they are joined by further resonances.

In the light of the properties of the non-linear lens conductor discussed earlier in this document, it is possible to specify advantageous areas of the Gouy parameters $\psi$ and the non-linear phase $\phi_{NL}$ which enable good compressibility of the spectrally broadened pulses and at the same time are not sensitive to fluctuations in the pulse power, the input parameter and the beam profile. The dependencies that must be considered for this purpose are:
  overlap of the eigenmodes for different momentary powers
  stability with regard to deviation from the eigenmode and change in the oscillation frequency with the momentary power
  aberrations of the Kerr lens and resonant coupling with higher modes All dependencies favour the smallest possible non-linear phase $\phi_{NL}$ per pass. Since a certain total phase $\Sigma\phi_{NL}$ must be reached for the spectral broadening to take place, however, the largest possible non-linear phase $\phi_{NL}$ per pass is advantageous, because the cost of the optical system grows with the number N of passes, and when a large number of optical elements are involved the losses at the optical surfaces may become considerable (AR and HR coatings). The non-linear phase that is achievable per pass depends on the Gouy parameter $\psi$ and the total phase $\Sigma\phi_{NL}$. The various dependencies provide contradictory requirements therefor, so a compromise must be found.

The change of the eigenmode with momentary power is greatest at the stability edges. For this reason, the arrangement must not be operated too close to one of the stability edges. Close to the stability centre ($\psi=\pi/2$), the arrangement is unstable with regard to deviations from the eigenmode. This region must therefore be avoided. The change in oscillating frequency with the momentary power is greatest around the stability centre and only becomes small when approaching the upper stability edge ($\psi=\pi$). Given these two considerations, a region is found to be advantageous that lies close to the upper stability edge but not so close that the change to the eigenmode becomes too great with momentary power, i.e. approx. $\psi=0.9\pi$. This region is also found using the resonances of higher transverse modes. At the same time, the non-linear phase $\phi_{NL}$ should not be greater than about $\pi/10$ per pass. For larger total phases ($\Sigma\phi_{NL}>4\pi$), this value should be smaller still.

When configuring a specific system, it may be necessary to observe further criteria such as damage thresholds, structural lengths, dispersion compensation and thermal lens.

Until now, the case of a regular lens conductor has been considered, that is to say an arrangement consisting of identical section and having a Gouy parameter $\psi$. It is also possible to use an arrangement that consists of differing sections, so that the Gouy parameter for propagation is different between the non-linear elements. For a lens conductor, this means different distances between the lenses and/or different focal lengths thereof. The assignment of an eigenmode and a Gouy parameter is based initially on a regular lens conductor. The eigenmode (fundamental mode) is then the mode that is reproduced after a pass, and the Gouy parameter is the Gouy phase that this mode acquires as a result. An assignment can also be made if the arrangement is not regular but consists of differing sections, as long as the arrangement has a periodicity, possibly only after several passes through a non-linear element. The eigenmode is then the mode that is reproduced after passes have been made through the arrangement until a section is repeated. In this way, differing Gouy phases may be acquired between the non-linear elements within the section. The arrangement is then described correspondingly with multiple Gouy parameters. In addition, a Gouy parameter may be specified as the (arithmetical) mean of these Gouy parameters, which should then satisfy the condition according to patent claim 1.

Besides a rotationally symmetrical arrangement, an arrangement with an elliptical and/or astigmatic beam may be used. If the beam radius is different in the two transverse directions at the site of the non-linear elements, the Kerr lens also has a different refractive power in these directions. However, the effect of this refractive power may be described for both directions with the same parameter $\phi_{NL}$, since it describes the phase shift between the beam axis and the edge of the beam for both directions. An arrangement may be configured in such manner that it has different Gouy parameters in the two transverse directions.

Figure 3:
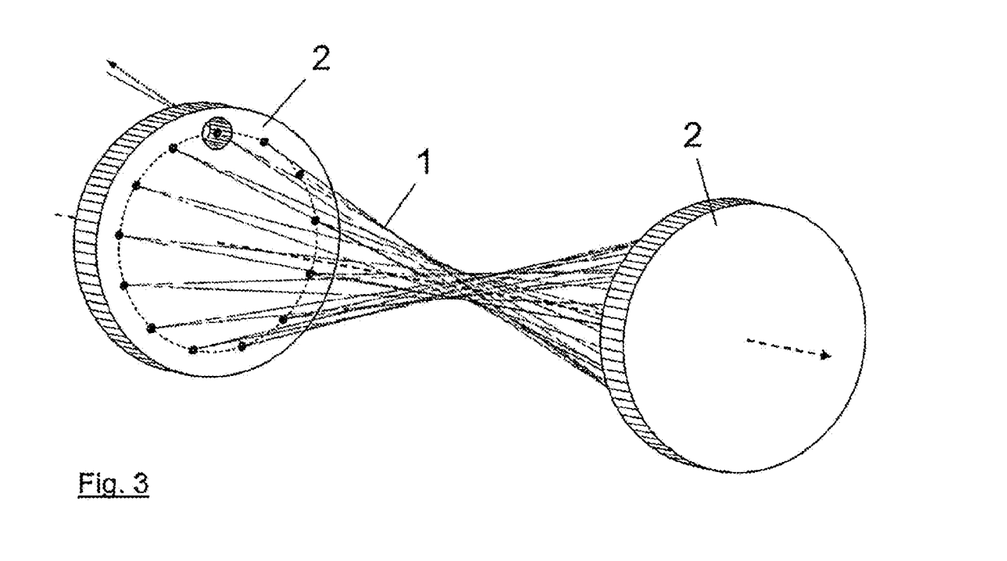
FIG. 3 is an example of a multipass cell as may be used in the suggested arrangement.

The suggested optical arrangement for carrying out the method may be realised simply and with little space requirement in the form of a multipass cell, such as is represented for exemplary purposes in FIG. 3. For this, preferably one or more thin non-linear elements (non-linear medium) are inserted into a mirror arrangement, in which the coupled in laser beam 1 with the laser pulses is reflected multiple times between two outer mirror elements 2 or mirrors. Of course, a mirror arrangement of such kind may also be supplemented with a lens or additional mirrors.

In a multipass cell, multiple reflexes may be arranged on the mirrors in a circle (or an ellipse) about the optical axis, wherein one reflex extends beyond the previous reflex by angle $\psi$ in the circle. $\psi$ is identical to the Gouy parameter for a complete circuit in the cell. If a non-linear element is located between the mirrors, or if both mirrors of the cell function as non-linear elements, the Gouy parameter for propagation between the non-linear elements is exactly half as large. A pattern with equidistant reflexes on the mirrors is thus created for Gouy parameter $\psi=K/N\cdot2\pi$ wherein K and N are natural numbers and must be relatively prime. In this case, N represents the number of reflexes in the circle, and K indicates the number of positions by which the beam drifts from one circuit to the next. After N circuits, that is to say one full circuit of the circle, the beam reaches its starting position again, that is to say a transformation is created. The Gouy parameter is then a multiple of $2\pi$. This also means that the q-parameter is reproduced (without Kerr lens) independently of the incident q-parameters.

At first sight, the condition $\psi=K/N\cdot2\pi$ conflicts with the requirement to avoid resonances from higher modes caused by aberrations of the Kerr lens at distinguished Gouy parameters. However, the resonances are strongest for small values of N, and a larger number of circuits is needed to achieve sufficient spectral broadening. For a value of the Gouy parameter between the non-linear elements such as $\psi=16/19\pi$, no resonance is to be expected for a non-linear phase per element $\phi_{NL}$ that is not too large.

The multipass cell of FIG. 3 represents a compact lens conductor design which can be used for non-linear pulse compression. In the case described, the Gouy parameter for one circuit is $\psi=12/13\cdot2\pi$, and the Gouy parameter for propagation from one mirror to the next is therefore $\psi=12/13\pi$. In this case, coupling into the cell and decoupling from the cell is carried out through a hole in the mirror.

Figure 4:
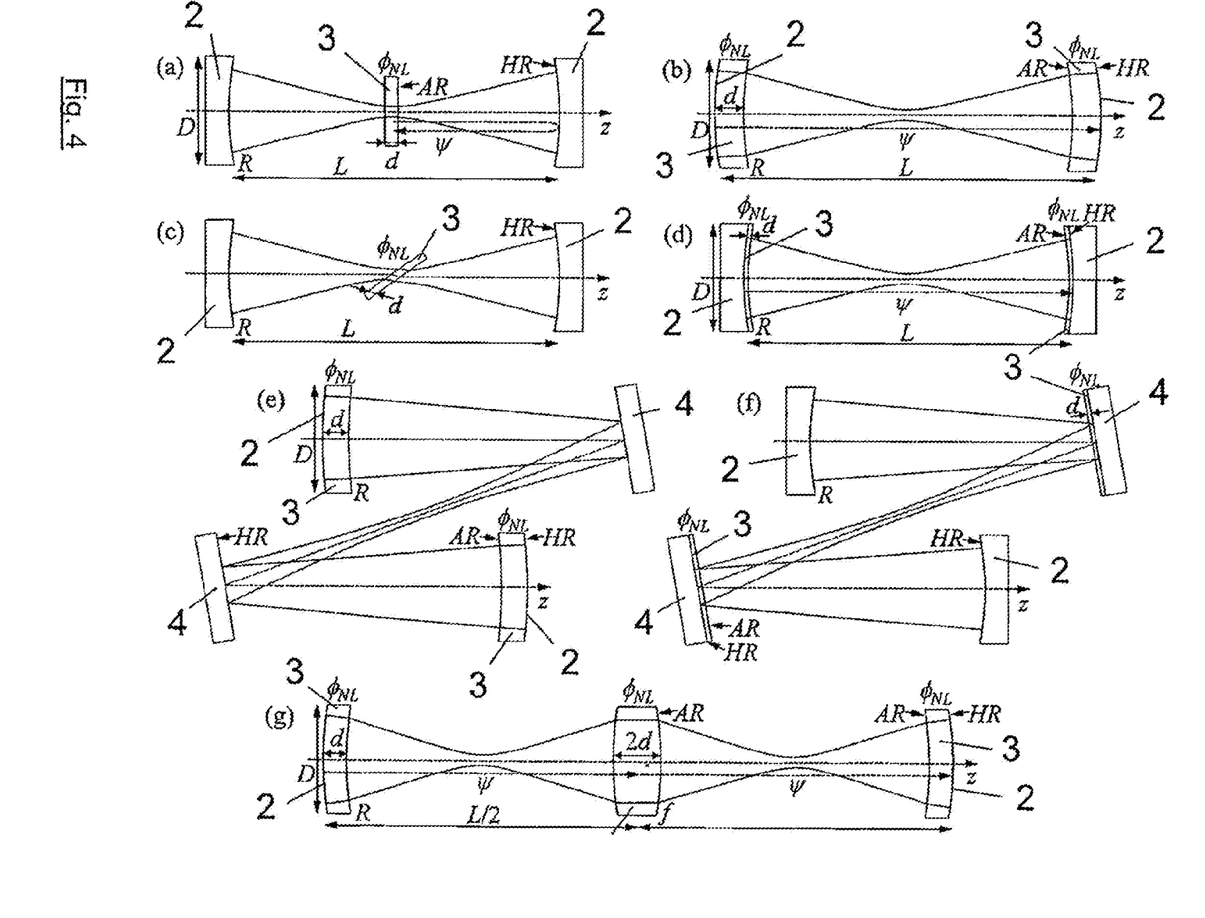
FIGS. 4a-g represent various arrangements of the mirror elements and the one or more non-linear elements in a multipass cell according to the suggested arrangement.

In a multipass cell of such kind, in the simplest case the mirror elements 2 of the cell may themselves function as the non-linear medium. For this purpose, the front sides thereof are furnished with an antireflex (AR) coating and the back sides are furnished with a highly reflective (HR) coating. FIG. 4 shows various advantageous variants of such a multipass cell, as may be used in the suggested arrangement. In the configuration of FIG. 4a, the multipass cell consists of two mirror elements 2 with a radius of curvature R and a separation L. A non-linear optical element 3 made from dielectric material is arranged between the two mirror elements 2. Thickness d of said element 3 is selected such that the eigenmode (fundamental mode) of this arrangement acquires non-linear phase $\phi_{NL}$ when passing through element 3. If non-linear optical element 3 is not arranged in the middle of the cell, as shown in the drawing and/or if the cell is not symmetrical, a different Gouy phase is acquired alternatingly between the passes through non-linear optical element 3.

FIG. 4b shows a variant in which the mirror substrates of the two mirror elements 2 are used as non-linear optical elements 3. To this end, the mirror elements 2 receive a AR coating on the front side and a HR coating on the back side. Mirror elements 2 again have radius of curvature R and are arranged at a distance L from each other. Thickness d of the mirror substrates is selected such that the eigenmode acquires phase $\phi_{NL}$ during a double pass.

FIG. 4c shows a variant of the arrangement that differs from the arrangement of FIG. 4a only in that non-linear optical element 3 is arranged at the Brewster angle between the mirror elements 2, so that small reflection losses are achieved even without AR coatings.

The multipass cell of FIG. 4d is constructed similarly to the multipass cell of FIG. 4b. In this configuration, however, it is not the mirror substrate of the respective mirror element 2 which serves as the non-linear medium, but a thin optical element 3 applied to the front side of mirror element 2. These thin, non-linear optical elements 3 can be contact bonded, glued, applied epitaxially or attached to the mirror by some other means.

FIG. 4f shows a variant in which such a thin non-linear optical element 3 is applied to plane mirrors 4, which are additionally positioned in the beam path of the arrangement as folding mirrors.

FIG. 4e shows a variant in which an arrangement such as that of FIG. 4b is folded by the addition of plane mirrors 4 to reduce the structure length. The small beam radius on plane mirrors 4 is possible because HR coatings have a higher damage threshold than AR coatings. The additional reflectivity on plane mirrors 4 can also be used for dispersion management.

Finally, FIG. 4g shows a variant in which fewer optical surfaces with corresponding losses are present per non-linear element due to the inclusion of a lens 5 (or multiple lenses) as a further non-linear element 3 in the cell. The arrangement does not necessarily have to be symmetrical. The indication of the beam course in the subdiagrams of FIG. 4 are intended to represent the beam bundles as they pass through the cells, not the eigenmodes of the cells.

The number of circuits in the multipass cell can be increased using suitable arrangements (Robert cell; multiple ellipses in a multipass cell, e.g., by means of an interference mirror). The arrangement may be expanded into a compression schema involving two (or more) stages, that is to say the pulses are compressed after a first spectral broadening and before they are spectrally broadened again in a second stage. Such a schema offers the advantage for spectral broadening in a fibre that for a certain non-linear phase (and accordingly compression factor) in the second stage a shorter propagation length in the fibre is sufficient, so that less dispersion is acquired, which limits compression to very short pulse durations. In the case of the arrangement suggested here, a further advantage is obtained. If a shorter pulse passes through the arrangement in the second stage, a more favourable ratio is achieved between the pulse power, which determines the strength of the Kerr lens, and the temporal derivation of the momentary power, which determines the spectral broadening. Accordingly, in a total phase $\Sigma\phi_{NL}$ that is limited by the influence of the Kerr lens, a greater spectral broadening and therewith shorter pulses are possible.

The arrangement may also be combined with a divided pulse compression (DPC) schema.

The suggested arrangement for non-linear compression through the transition from a waveguide to a lens conductor overcomes the limitation of pulse power to values lower than the critical power for self-focusing $P_{crit}$ (i.e. limitation of the pulse energy lower than $E_{crit}=P_{crit}\cdot\tau$). Instead, in this case the limitation due to the Kerr effect relates to the non-linear phase per non-linear element $\phi_{NL}$ and the non-linear total phase $\Sigma\phi_{NL}$ as was described previously.

In the suggested arrangement consisting of one or more dielectric, non-linear elements, pulses with pulse powers in the range from about 12 MW up to 2 GW may be compressed. For a pulse duration of 800 fs, for example, this corresponds to energies in the order from approx. 12 µJ to 2 mJ.

The lower level of pulse energy is limited by the fact that the beam cannot be too small when it is focused into the non-linear medium because otherwise self-focusing occurs. The Rayleigh length of the focused beam must be large compared with thickness d of the non-linear element: $d<<z_R=A/\lambda_n$ with cross sectional area A and wavelength $\lambda_n$ of the beam (in the medium). From this it follows with the non-linear phase $\phi_{NL}=k\cdot n_2\cdot P/A\cdot d$ for pulse power $P=\phi_{NL}\cdot A/(k\cdot n_2\cdot d)>>\phi_{NL}\cdot\lambda_n/(k\cdot n_2)=\phi_{NL}\cdot P_{crit}$. If the non-linear phase is to have a value of approximately $\phi_{NL}=\pi/10$, that means roughly that $P>3\cdot P_{crit}$. The minimum pulse power is thus barely an order of magnitude larger than the maximum power for spectral broadening in a waveguide (fibre). For quartz glass, where $P_{crit}=4$ MW, this is a minimum pulse power of 12 MW.

The upper value of the pulse power is limited by the damage threshold of the non-linear medium (or the coating thereof) together with a limitation of the cross-sectional area of the beam, which is defined by the dimensions of the arrangement. Besides the damage threshold, a limitation of the fluence is created by the restriction to thickness d of the non-linear medium: to guarantee that the structure is mechanically and thermally stable, it must not be too small. This is particularly true when large average powers are involved. For example, in the assumed case of thickness d>5 mm, it follows for $\tau=800$ fs, $\lambda=1$ µm, quartz glass and a non-linear phase $\phi_{NL}=\pi/10$ that fluence $F=\phi_{NL}\cdot\tau/(k\cdot n_2\cdot d)<30$ mJ/cm². In this case, this is lower than the damage threshold (about 1 J/cm²) and therefore represents the limitation of the fluence. If the beam makes a double pass through the non-linear element, as in FIG. 4b, each occurrence of d must be replaced with 2d.

Accordingly, an upper limit on the pulse energy results in combination with a limitation of the dimensions. A large cross-sectional area requires a large separation L between the non-linear elements and setting close to the upper or lower edge of stability, i.e. a Gouy parameter $\psi$ close to 0 or $\pi$. Since the change of the eigenmode caused by the Kerr lens becomes very large (see FIG. 2a) close to the stability edges, the distance from the arrangement to the stability edge cannot be smaller than a certain value. For a symmetrical construction (see FIG. 2b), $A=\pi w^2=L\cdot\lambda/\sin(\psi)$. For a maximum Gouy parameter of $\psi=18/19\pi$ for example and a still practical distance L=1 m, A=0.06 cm² for $\lambda=1$ µm. The pulse power is thus limited to <2 GW (pulse energy 2 mJ).

In order to address the limitation by the damage threshold of the mirrors, non-linear elements may be used that have smaller thickness d or a smaller non-linearity. The former can be reached for example by affixing a thin non-linear element to a mirror (see FIG. 4d). The latter for example by using a gas instead of a dielectric medium.

Limitation of the pulse power is then assured by the damage threshold of the mirrors. A damage threshold of about 1 J/cm² for a pulse duration von 800 fs allows a fluence of approx. 300 mJ/cm² with a safety factor. Together with the limitation to the cross sectional area described previously, this corresponds to a pulse power of 20 GW (pulse energy 20 mJ).

If a gas is used as a non-linear medium, the non-linearity can be adjusted, which yields a flexibility regarding a change in the pulse energy. This may be effected by means of the gas pressure or the mixing proportion of two gases. For example, the gases neon ($0.74\cdot 10^{-20}$ cm²/W/bar) and argon ($9.8\cdot 10^{-20}$ cm²/W/bar) may be combined. At atmospheric pressure, the non-linear refractive index can be adjusted in a range from 0.74 to $9.8\cdot 10^{-20}$ cm²/W by varying the partial pressures.

Figure 5:
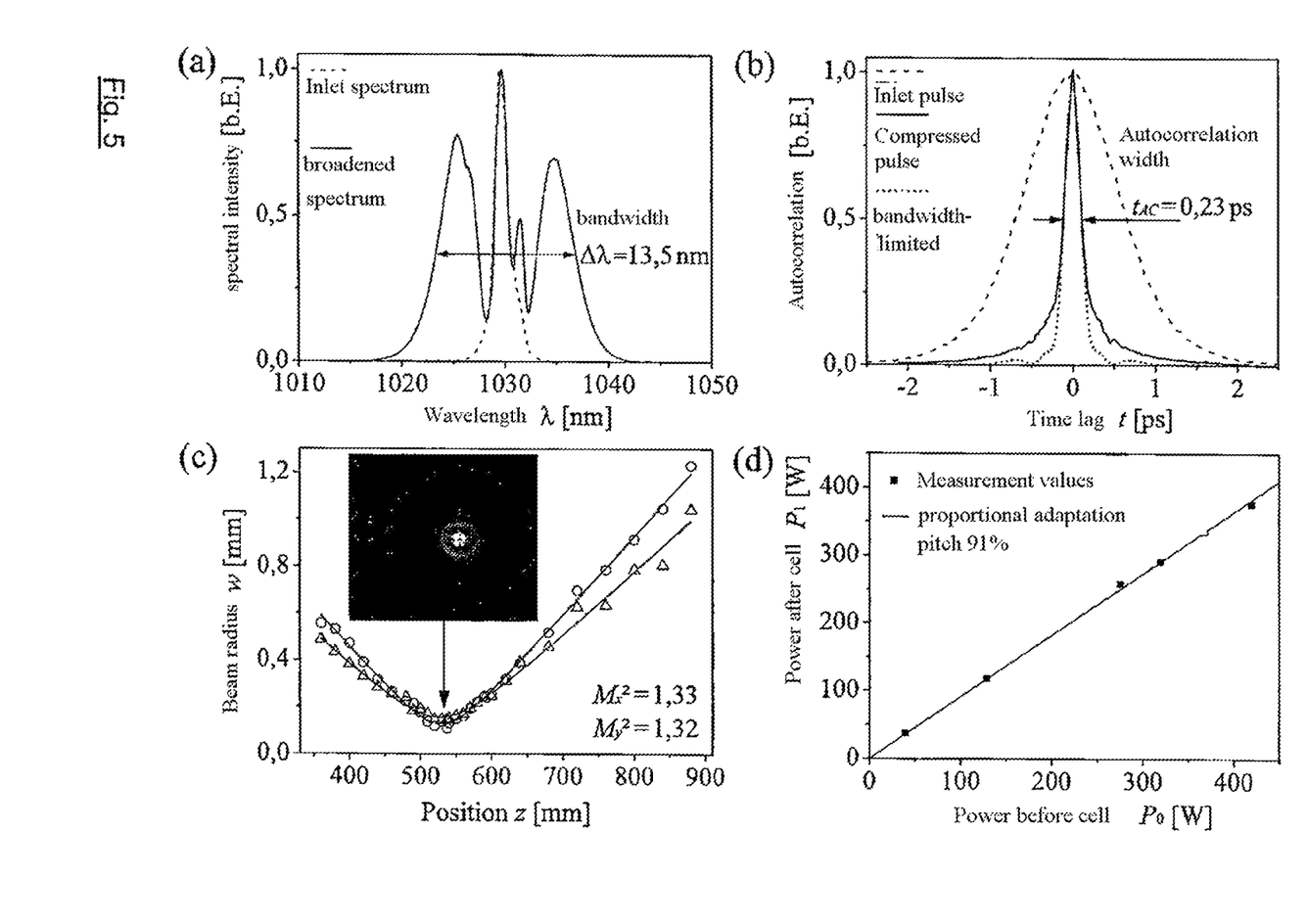
FIGS. 5a-d show experimental results for the demonstration of the suggested method for pulse compression.

The novel method for non-linear pulse compression has been demonstrated experimentally. Pulses with pulse duration $\tau=0.88$ ps and pulse energy E=42 µJ with a repetition rate $\nu_{rep}=10$ MHz ($P_m=420$ W average power) were spectrally broadened with a multipass cell (Gouy parameter $\psi=16/19\pi$, 38 passes through a non-linear element made of quartz glass) and then compressed with chirped mirrors (3 reflexes with approximate GDD=$-10000$ fs²). The autocorrelation width after compression is $t_{AC}=0.23$ ps. This corresponds to a pulse duration of about $\tau=0.17$ ps and accordingly a compression factor of 5. The compressed power is $P_m=375$ W, corresponding to E=37.5 µJ pulse energy. The beam quality is preserved in the arrangement and has a value $M^2=1.33\times 1.32$ after the cell. FIG. 5 presents the experimental results. FIG. 5a shows the spectrum after broadening together with the input spectrum, FIG. 5b illustrates the measured autocorrelation after compression together with the autocorrelation of the input pulse and the calculated autocorrelation obtained for a bandwidth-limited pulse with the broadened spectrum, FIG. 5c shows the beam caustic after compression together with the beam profile in the waist, and FIG. 5d shows the power transmitted through the cell for various incident powers.

With a value of $P_p=42$ MW, the pulse power of the incident pulse is significantly higher than the critical power of the non-linear medium ($P_{crit}=4$ MW). The power transmitted through the cell increases approximately proportionally to the incident power (FIG. 5d), that is to say the transmission is independent of the power and of the non-linear phase. The transmission T=91% can be explained with the reflection losses of the mirrors (HR>99.95%, AR<0.1%).

The suggested arrangement for non-linear pulse compression is not sensitive to fluctuations in the pulse power, the beam position or the beam parameters. It responds benignly to interference in the beam profile, that is to say the beam and the spectral broadening are not negatively influenced. In particular, intensity ripples do not occur on the profile. The arrangement does not require diaphragms, a plasma or the like to damp the beam diameter change caused by the Kerr lens, and has substantial transmission. The arrangement is therefore highly suitable for use in compressing pulses with large average power. The method is not limited to pulse powers lower than the critical power of dielectrics and is thus suitable for a pulse energy range that cannot be reached by spectral broadening in glass fibres.

LIST OF REFERENCE NUMBERS

1 Laser beam
2 Mirror element
3 Non-linear optical element
4 Plane mirror
5 Lens

The invention claimed is:
1. Method for spectral broadening of laser pulses for non-linear pulse compression, in which the laser pulses are input into an optical arrangement in which they propagate alternatingly through at least one section containing at least one medium with non-linear optical properties, and in which the laser pulses are endowed with a non-linear phase through self-phase modulation, and at least one section in which substantially no non-linear phase is generated by self-phase modulation, wherein
   the pulse power of the laser pulses is selected to be greater than the critical power of the medium with non-linear optical properties,
   the non-linear phase of the laser pulses generated with each pass through the medium with non-linear optical properties is set by selection of the length of the medium and the intensity of the laser pulses to be so small that catastrophic self-focusing does not occur inside the medium,
   the number of passes for producing the non-linear phase is at least 10 and is selected such that upon exiting the arrangement the laser pulses have a desired non-linear phase, and
   the optical arrangement is dimensioned such that the Gouy parameter $\psi$ of the arrangement, representing the Gouy phase acquired by the fundamental mode of the arrangement during propagation through the medium with non-linear optical properties and the section in which no non-linear phase is generated, lies neither in the middle nor directly on the edge of the stability range $0 \leq \psi \leq \pi$ of the arrangement.

2. Method according to claim 1, characterised in that the arrangement is dimensioned such that resonances of higher transverse modes are avoided, and the Gouy parameter $\psi$ lies closer to the edge than the middle of the stability range.

3. Method according to claim 1, characterised in that the arrangement is dimensioned such that the Gouy parameter $\psi$ is between $0.03\pi$ and $0.24\pi$ or between $0.76\pi$ and $0.97\pi$.

4. Method according to claim 1, characterised in that the arrangement is dimensioned such that the Gouy parameter $\psi$ for a non-linear phase of $2\pi$ acquired before exiting the arrangement lies between $0.81\pi$ and $0.97\pi$ and between $0.88\pi$ and $0.96\pi$ for a non-linear phase of $4\pi$ acquired before exiting the arrangement.

5. Method according to claim 1, characterised in that the non-linear phase generated with each pass through the medium with non-linear optical properties is selected to be $\leq \pi/10$.

6. Method according to claim 1, characterised in that the arrangement is dimensioned such that the Gouy parameter $\psi$ for a non-linear phase of $8\pi$ acquired before exiting the arrangement lies between $0.90\pi$ and $0.97\pi$, and the non-linear phase generated with each pass through the medium with non-linear optical properties is selected to be $\leq \pi/20$.

7. Method according to claim 1, characterised in that a solid medium is used as the medium with non-linear optical properties.

8. Method according to claim 1, characterised in that a gas-phase medium is used as the medium with non-linear optical properties.

9. Method according to claim 8 characterised in that the non-linear optical properties of the gas-phase medium are adjusted via the gas pressure.

10. Method according to claim 8 characterised in that a gas mixture of at least two different gases at atmospheric pressure is used as the gas-phase medium, and the non-linear optical properties of the gas-phase medium are set by means of the partial pressure of the two different gases.

11. Arrangement for spectral broadening of laser pulses for non-linear pulse compression, which has an optical fundamental mode and in which after they have been input the laser pulses propagate alternatingly through at least one section that contains at least one medium with non-linear optical properties and in which the laser pulses are endowed with a non-linear phase by self-phase modulation, and at least one section in which essentially no non-linear phase is produced by self-phase modulation, wherein
   the length of the medium is selected such that the non-linear phase of the laser pulses generated with each pass through the medium with a pulse power that is greater than the critical power of the medium with non-linear optical properties is so small that catastrophic self-focusing does not occur inside the medium, and
   the optical arrangement is dimensioned such that the number of passes for producing the non-linear phase is at least 10, and the Gouy parameter $\psi$ of the arrangement, which represents the Gouy phase acquired by the fundamental mode during propagation through the medium with non-linear optical properties and the section in which no non-linear phase is generated, lies neither in the middle nor directly on the edge of the stability range $0 \leq \psi \leq \pi$ of the arrangement.

12. Arrangement according to claim 11, characterised in that the arrangement comprises at least two mirror elements, at which the laser pulses are reflected multiple times.

13. Arrangement according to claim 12, characterised in that the arrangement is constructed as a multipass cell.

14. Arrangement according to claim 12, characterised in that the medium is arranged as a non-linear element between the mirror elements.

15. Arrangement according to claim 12, characterised in that at least one of the mirror elements includes a substrate of an optically transparent dielectric material, which has a highly reflective coating on a back side thereof, wherein the substrate serves as the medium with non-linear optical properties.

16. Arrangement according to claim 12, characterised in that the mirror elements are furnished with a coating, through which at least a partial compensation is achieved for a dispersion the laser pulses experience when passing through the arrangement.

17. Arrangement according to claim 11, characterised in that the medium with non-linear optical properties is a solid medium.

18. Arrangement according to claim 11, characterised in that the medium with non-linear optical properties is a gas-phase medium.

* * * * *

UNITED STATES PATENT AND TRADEMARK OFFICE
CERTIFICATE OF CORRECTION

PATENT NO. : 9,847,615 B2  
APPLICATION NO. : 15/310506  
DATED : December 19, 2017  
INVENTOR(S) : Russbueldt et al.

Page 1 of 1

It is certified that error appears in the above-identified patent and that said Letters Patent is hereby corrected as shown below:

On the Title Page

Column 1, item (73) (Assignees) the word "FAUNHOFER" should read --FRAUNHOFER--.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*